United States Patent [19]
Luu

[11] Patent Number: 5,096,343
[45] Date of Patent: Mar. 17, 1992

[54] INTERNAL THREAD FORMING APPARATUS WITH AN AUTOMATIC ROTATIONAL DIRECTION CHANGE CONTROLLER

[76] Inventor: Ching-Muh Luu, No. 304. Yueh-Mei-Tan, Yueh-Tan Tsuen, Hsin-Kang Hsiang. Chiayi Hsien, Taiwan

[21] Appl. No.: 714,661

[22] Filed: Jun. 13, 1991

[51] Int. Cl.⁵ .................. B23B 47/14; B23G 3/00
[52] U.S. Cl. .................. 408/134; 10/136 R; 10/136 TS; 74/378; 192/21; 192/51; 408/139; 408/142
[58] Field of Search .......... 10/129 R, 136 R, 136 TS, 10/138; 408/132, 134, 139, 141, 142; 192/21, 51, 46, 67 R, 108; 74/376, 378

[56] References Cited

U.S. PATENT DOCUMENTS

| | | | |
|---|---|---|---|
| 2,567,511 | 9/1951 | Elder | 408/134 |
| 3,041,893 | 7/1962 | Johnson | 10/136 R |
| 3,397,588 | 8/1968 | Johnson | 192/46 |
| 3,717,892 | 2/1973 | Johnson | 408/134 |
| 3,998,565 | 12/1976 | Tanaka | 74/376 |
| 4,014,421 | 3/1977 | Johnson | 408/139 |

Primary Examiner—Daniel W. Howell
Attorney, Agent, or Firm—Morgan & Finnegan

[57] ABSTRACT

An internal thread forming apparatus includes a housing body fixed on a machine tool, a driving spindle connected to the rotatable main shaft of the machine tool and rotatable at the same speed as that of the main shaft, a movable body movable vertically within the housing body, a rotary lever actuatable to move the movable body downward, and a first return spring biasing the rotary lever to return to a static position. A positive-revolution driving body and a reverse-revolution driving body are carried on and are movable synchronously with the movable body, and rotate in opposite directions. A speed reduction gearing interconnects the driving spindle and the face gears so as to rotate the face gears at a speed less than that of the driving spindle. An output spindle is mounted slidably within the movable body. A tap is fastened to the output spindle. A driving block is carried on the output spindle. When the rotary lever is actuated, the movable body and the tap move downward, in such a manner that the driving block engages with the positive-revolution driving body, so as to rotate the tap in one direction. When the rotary lever is released, the driving block engages with the reverse-revolution driving body, so as to rotate the tap in the opposite direction.

3 Claims, 17 Drawing Sheets

INTERNAL THREAD FORMING APPARATUS WITH AN AUTOMATIC ROTATIONAL DIRECTION CHANGE CONTROLLER

BACKGROUND OF THE INVENTION

1. Field of the Invention

This invention relates to an internal thread forming apparatus, more particularly to an internal thread forming apparatus which rotates a tap in one direction when actuating a rotary lever, and in the opposite direction when letting go of the rotary lever.

2. Description of the Related Art

Because a conventional internal thread forming apparatus is normally used in association with the cutter feeding device of a machine tool, the precision of the internal thread forming apparatus is reduced. To increase precision, it is necessary for an internal thread forming apparatus to be provided with a built-in tap feeding device. It is understood that the higher the rotational speed of a tap, the smaller the torsion of the tap used for forming an internal thread. The rotational speed of the rotatable main shaft of the machine tool is too high to allow a conventional internal thread forming apparatus to produce a wide size range of internal thread. For example, it is difficult for a conventional internal thread forming apparatus to produce internal threads of more than a 16 mm-diameter. Accordingly, it is necessary to install a rotational speed reduction device in an internal thread forming apparatus in order to increase the torsion of the tap.

SUMMARY OF THE INVENTION

It is therefore the main object of this invention to provide an internal thread forming apparatus which has a built-in feeding device and a built-in speed reduction gearing.

According to this invention, an internal thread forming apparatus includes a housing body adapted to be fixed on a machine tool. A driving spindle is journalled in the top portion of the housing body and adapted to be connected securely to the rotatable main shaft of the machine tool, so as to rotate with the rotatable main shaft. A speed reduction gearing is installed in the housing body and connected to the driving spindle. The power of the speed reduction gearing is output from a rotating output member which rotates at a speed smaller than that of the driving spindle. A feeding device includes a movable body movable vertically within the lower portion of the housing body, a rotary lever installed on the housing body and actuatable to move the movable body downward, and a first return spring biasing the rotary lever to return to a static position. A positive and reverse revolution gearing is mounted in the movable body and includes a positive-revolution face gear, a reverse-revolution face gear, and at least one idle face gear meshing with the positive-revolution face gear and the reverse-revolution face gear so as to rotate the positive-revolution and reverse-revolution face gears in opposite directions. The positive and reverse revolution gearing is movable synchronously with the movable body in the housing body. A positive-revolution driving body is mounted rotatably in the housing body and connected securely to the positive-revolution face gear so as to rotate the positive-revolution driving body synchronously with the positive-revolution face gear. A reverse-revolution driving body is mounted rotatably in the housing body and connected securely to the reverse-revolution face gear so as to rotate the reverse-revolution driving body synchronously with the reverse-revolution face gear. An output spindle is mounted slidably within the movable body. A driving block is secured to the output spindle and carried on the output spindle to move between an uppermost position, where the driving block engages the positive-revolution driving body, and a lowermost position, where the driving block engages the reverse-revolution driving body, and a second return spring biasing the positive-revolution driving body to engage with the driving block. The output spindle is adapted to mount a tap on the lower end thereof. When the rotary lever is actuated to move the movable body downward, the positive and reverse revolution gearing impels the output spindle to move downward while keeping the driving block engaged with the positive-revolution driving body. The positive-revolution and reverse-revolution face gears can be rotated by the rotating output member of the speed reduction gearing. The engagement of the driving block with the positive-revolution driving body rotates the tap in one direction, while the engagement of the driving block with the reverse-revolution driving body rotates the tap in the opposite direction. When the rotary lever is released, after feeding the tap with a predetermined depth of cut, the first return spring biases the movable body to move upward relative to the output spindle. This is due to the fact that the tap is stuck in a workpiece to be machined, so as to engage the reverse-revolution driving body with the driving block, thereby removing the tap from the workpiece with the assistance of the first return spring.

BRIEF DESCRIPTION OF THE DRAWING

Other features and advantages of this invention will become apparent in the following detailed description of a preferred embodiment of this invention, with reference to the accompanying drawings, in which:

FIG. 18 is a sectional view illustrating the operation of the automatic clutch when the return movement of the tap is finished in accordance with this invention.

DESCRIPTION OF THE PREFERRED EMBODIMENT

Figure 1:
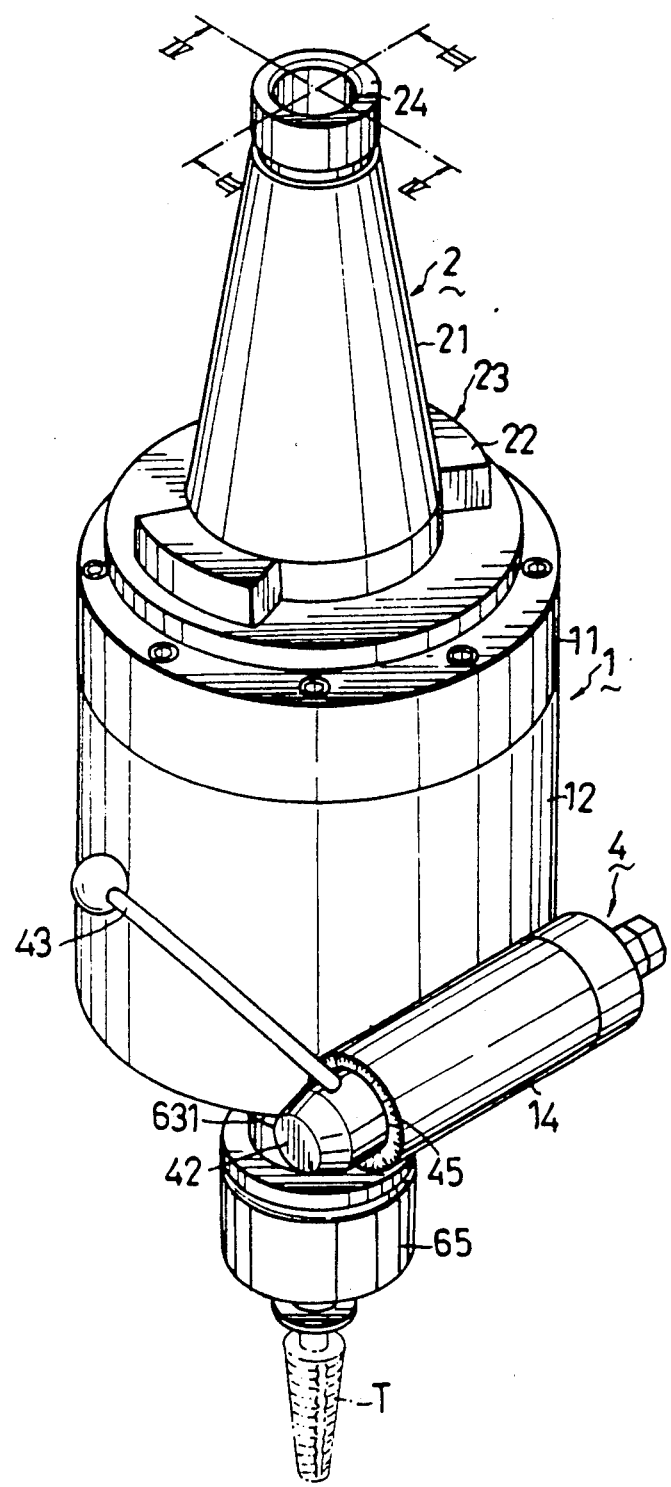
FIG. 1 is a perspective view of an internal thread forming apparatus according to this invention.

Referring to FIGS. 1, 2A, 2B and 2C, an internal thread forming apparatus of this invention consists of a housing body 1, a driving spindle 2, a speed reduction gearing 3, a feeding device 4, a positive and reverse revolution gearing 5 and an automatic clutch 6.

The housing body 1 is fixed on a machine tool (not shown) and consists of an upper housing 11 and a lower housing 12 connected securely to the upper housing 11. The lower housing 12 has a vertical keyway 13 (see FIG. 4) provided in the inner wall thereof. A gear cylinder 14 is connected securely to the lower housing 12 and has an internal chamber which is communicated with the internal chamber of the lower housing 12.

The driving spindle 2 extends through the center of the upper housing 11 and has a tapered top portion 21, an insertion lower portion 22 with two stops 23, and an axial bore 24 formed through the driving spindle 2. The driving spindle 2 is connected securely to the rotatable main shaft (not shown) of a machine tool, so as to rotate synchronously therewith.

Figure 5:
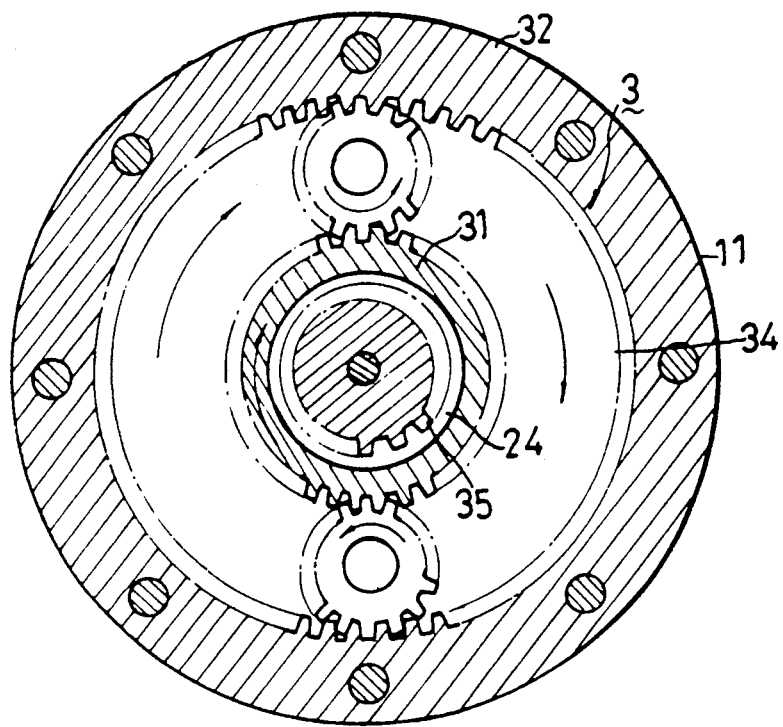
FIG. 5 is a sectional view taken along Line V—V in FIG. 4.

Referring to FIG. 5, the speed reduction gearing 3 consists of a planetary gear train which includes a central sun gear 31, a ring gear 32, two planetary gears 33 and a carrier 34 with an internally splined portion 35. The sun gear 31 is sleeved rigidly on the lower end portion of the driving spindle 2. The ring gear 32 is disposed on the inner wall of the upper housing 11. The planetary gears 33 are angularly spaced apart from each other and mounted pivotally on the carrier 34, so as to mesh with the sun gear 31 and the ring gear 32. The carrier 34 acts as the rotating output member of the speed reduction gearing 3 and rotates at a speed less than that of the driving spindle 2.

Figure 6:
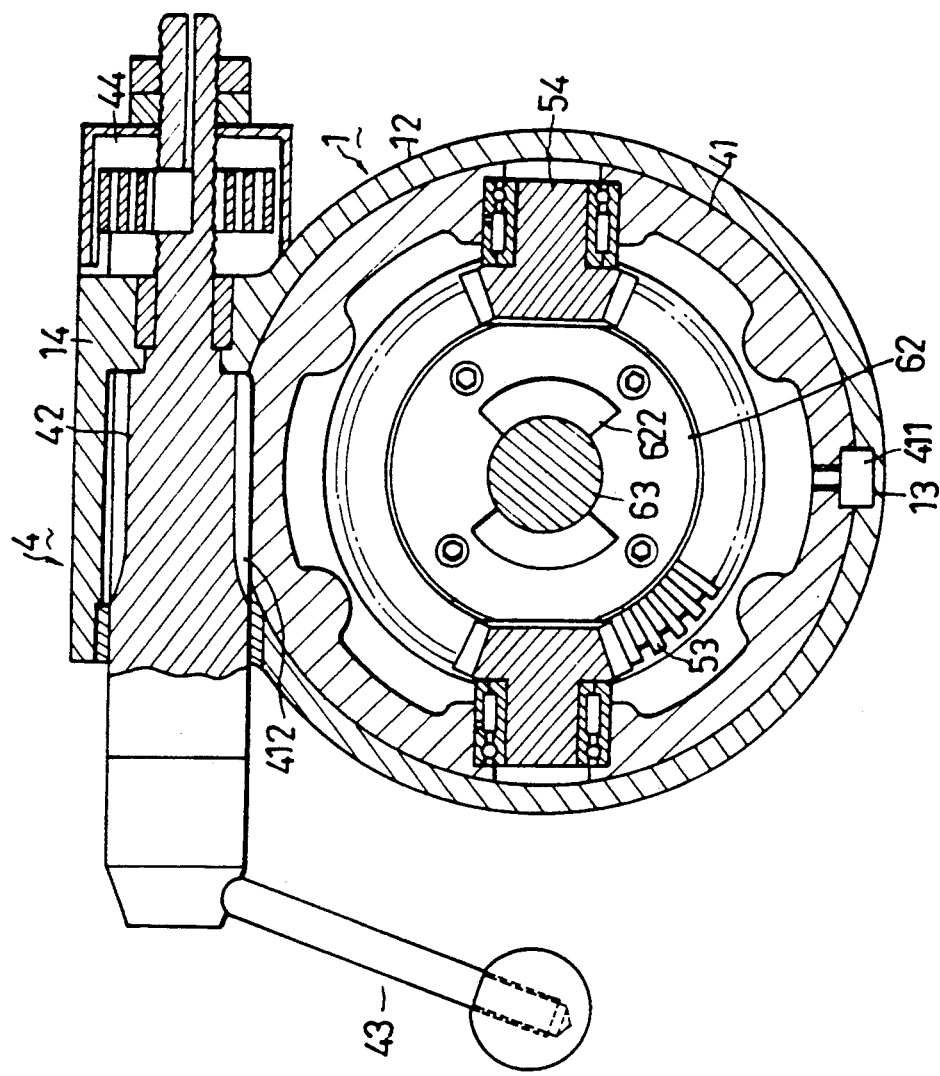
FIG. 6 is a sectional view taken along Line VI—VI in FIG. 4.

Referring to FIG. 6, the feeding device 4 includes a movable body 41 mounted movably in the lower housing 12. The movable body 41 is provided, on one side thereof, with a key 411 which is engaged with the keyway 13 of the lower housing 12, so as to guide the movable body 41 to move up and down. A rack 412 is secured to the opposite side of the movable body 41. A pinion 42 is journalled within the gear cylinder 14 and meshes with the rack 412. A rotary lever 43 is connected securely to an end of the pinion 42. When the knob (see FIG. 1) is depressed to turn the rotary lever 43 downward, the pinion 42 rotates to activate the rack 412 and the movable body 41 to move downward, due to the fact that the pinion 42 meshes with the rack 412. A first return spring 44 is connected to the pinion 42 at one end thereof and to the inner wall of the gear cylinder 14 at the other end thereof, so as to return the pinion 42 and the rotary lever 43 to their static positions in which the movable body 41 is in its uppermost position. A feeding scale 45 is provided on an end portion of the outer wall of the gear cylinder 14 near the rotary lever 34, so that the user can control the depth of cut of the tap (T), i.e. the displacement of the movable body 41.

Figure 2A:
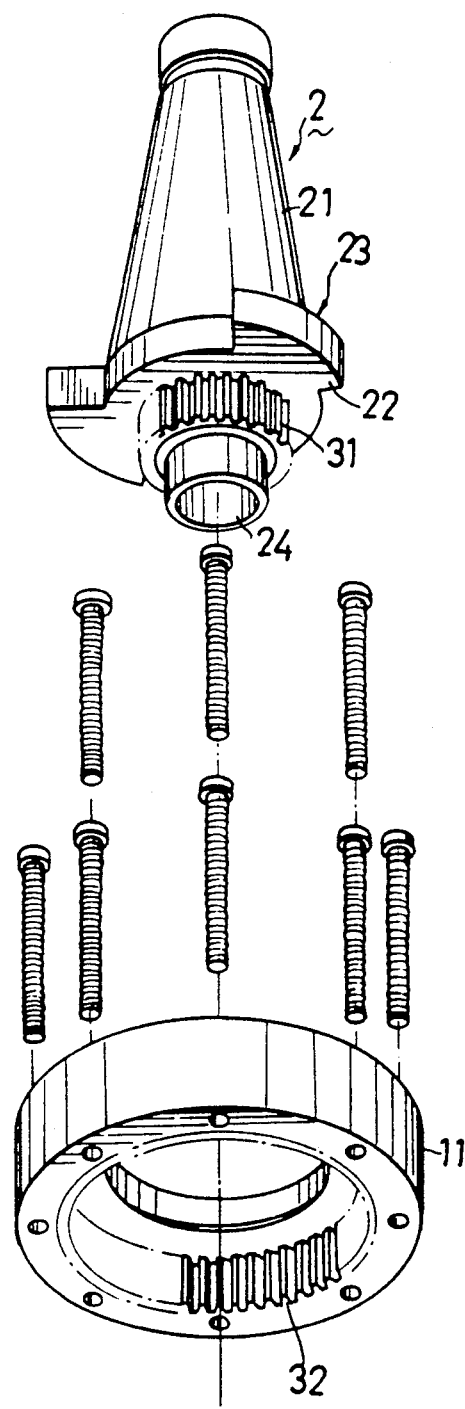
FIGS. 2A, 2B and 2C are exploded views, respectively showing a portion of the internal thread forming apparatus according to this invention.
Figure 2B:
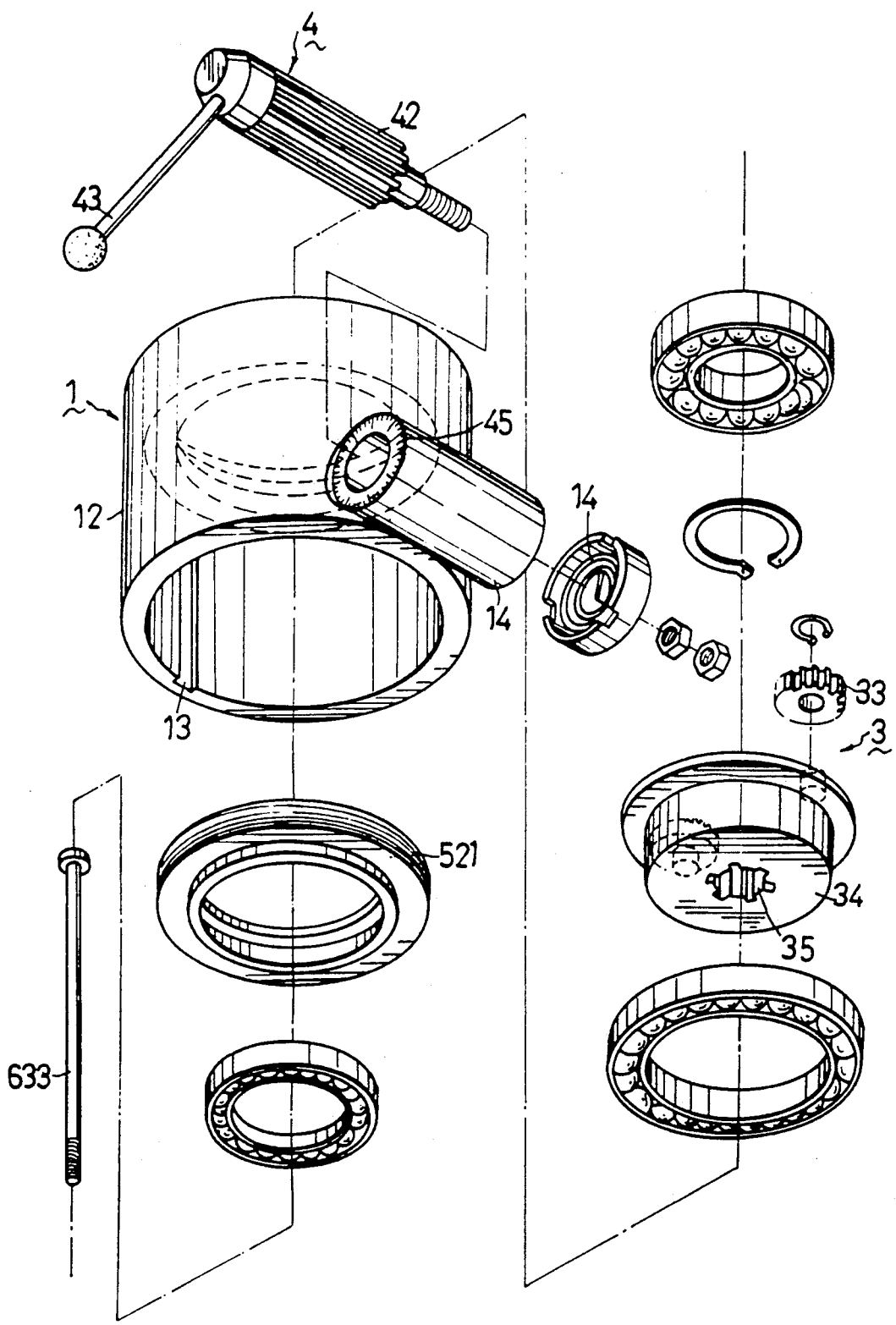
Figure 2C:
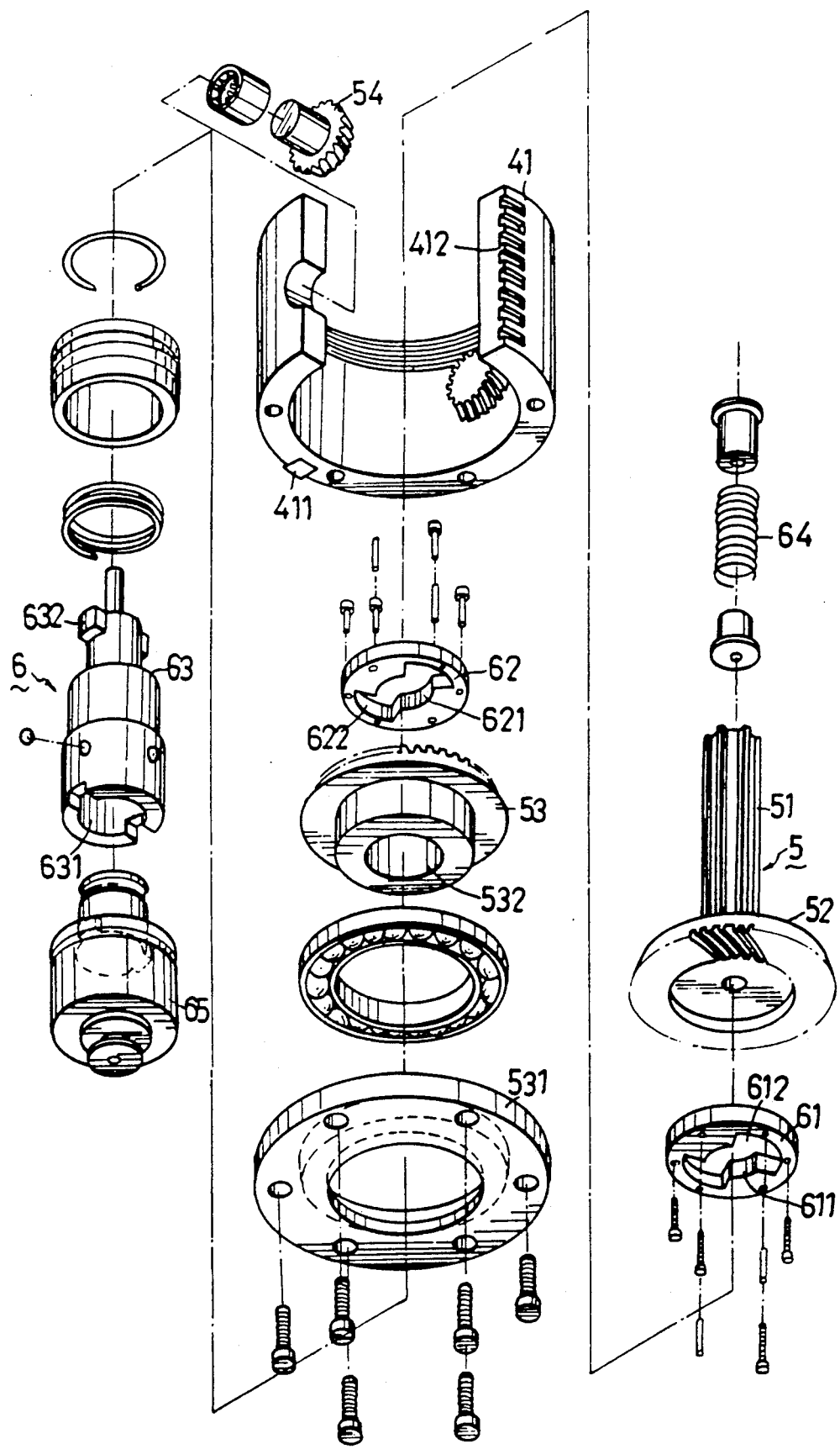
Figure 3:
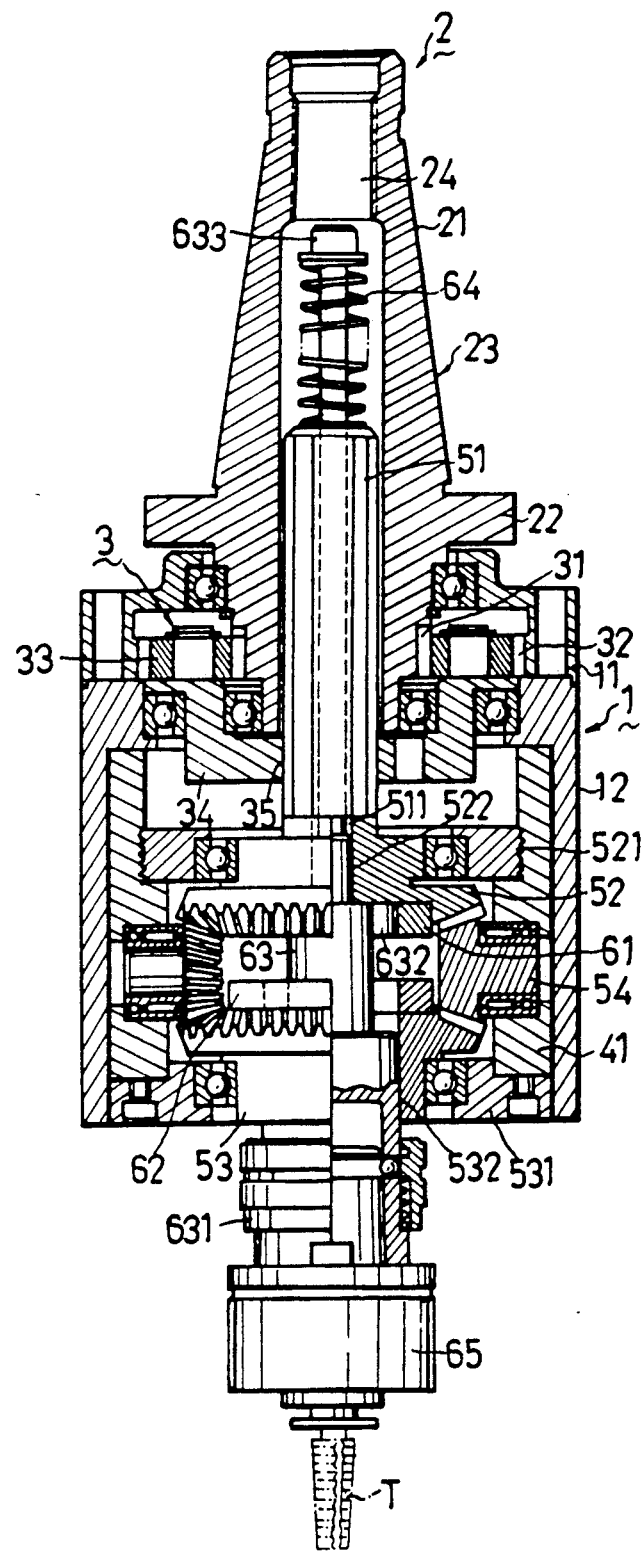
FIG. 3 is a sectional view taken along Line III—III in FIG. 1.
Figure 4:
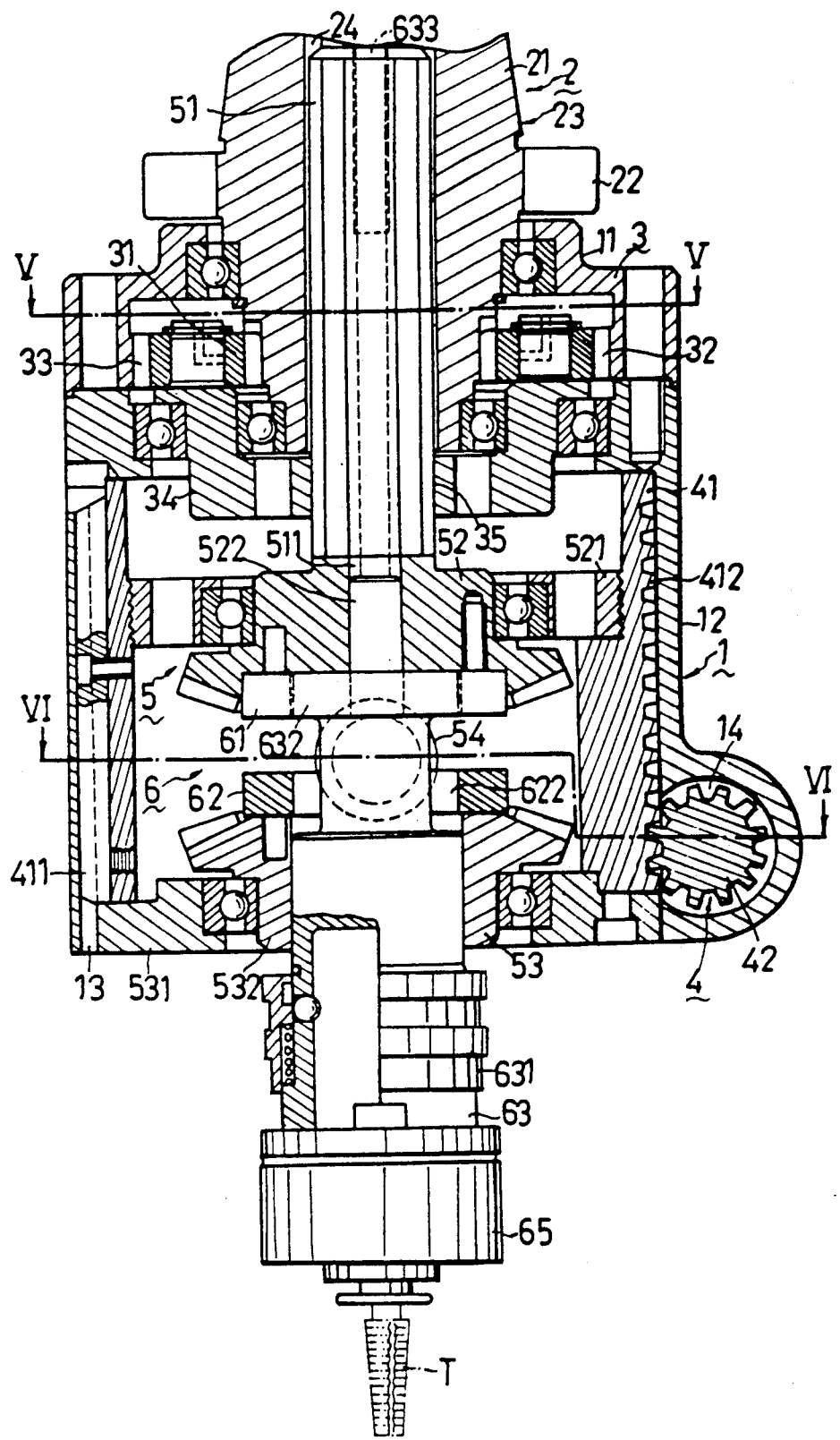
FIG. 4 is a sectional view taken along Line IV—IV in FIG. 1.

Referring to FIGS. 2, 3, and 4, the positive and reverse revolution gearing 5 is mounted in the movable body 41 and carried thereon to move up and down. An input spline shaft 51 is engaged within the internally splined portion 35 of the carrier or rotating output member 34 of the speed reduction gearing 3, so as to rotate synchronously with the carrier 34. A positive-revolution face gear 52 is integral with the spline shaft 51 and journalled within an upper support seat 521 which is engaged threadably within the upper portion of the movable body 41. A reverse-revolution face gear 53 is aligned with the positive-revolution face gear 52 and journalled within a lower support seat 531 which is fixed in the lower portion of the movable body 41. Two idle face gears 54 interconnect the positive-revolution face gear 52 and the reverse-revolution face gear 53, so as to rotate the positive-revolution face gear 52 and the reverse-revolution face gear 53 in opposite directions when the rotation of the speed reduction gearing 3 is transferred to the positive and reverse revolution gearing 5. Each of the input spline shaft 51, the positive-revolution face gear 52, and the reverse-revolution face gear 53 has an axial bore 511, 522, and 533 which is communicated with the axial bore 24 of the driving spindle 2.

Again referring to FIGS. 2, 3, and 4, the automatic clutch 6 includes a positive-revolution driving body 61 screwed to the bottom surface of the positive-revolution face gear 52, and a reverse-revolution driving body 62 screwed to the top surface of the reverse-revolution face gear 53. Each of the positive-revolution driving body 61 and the reverse-revolution driving body 62 has a central hole 611, 621, and two driving side holes 612, 622. An output spindle 63 is mounted slidably in the movable body 41 and extends from the lower end of the housing body 1. A retainer 631 is installed on the lower end of the output spindle 63, so as to retain a connector 65 thereon. A tap (T) can be locked on the connector 64. Two aligned driving blocks 632 are secured to the upper portion of the output spindle 63 and can move between an uppermost portion, where the driving blocks 632 engage within the driving side holes 612 of the positive-revolution driving body 61, and a lowermost position, where the driving blocks 632 engage within the driving side holes 622 of the reverse-revolution driving body 62. Referring to FIG. 2C, a second return spring 64 pushes the positive-revolution face gear 52 downward to press against the driving blocks 632 of the output spindle 63, so as to engage the driving blocks 632 within the driving side holes 612 of the positive-revolution driving body 61. The elastic modulus of the second return spring 64 is smaller than that of the first return spring 44. In other words, the spring force of the first return spring 44 is greater than that of the second return spring 64. When the driving blocks 632 engage within the driving side holes 612 of the positive-revolution driving body 61, both the output spindle 63 and the tap (T) rotate in the same direction as that of the positive-revolution face gear 52 and the positive-revolution driving body 61, so as to move the tap downward, thereby forming an internal thread in the workpiece (not shown) to be machined. When the driving blocks 632 engage within the driving side holes 622 of the reverse-revolution driving body 62, both the output spindle 63 and the tap (T) rotate in the same direction as that of the reverse-revolution face gear 53 and the reverse-revolution driving body 62, so as to move the tap (T) upward, thereby removing the tap (T) from the workpiece.

Figure 7:
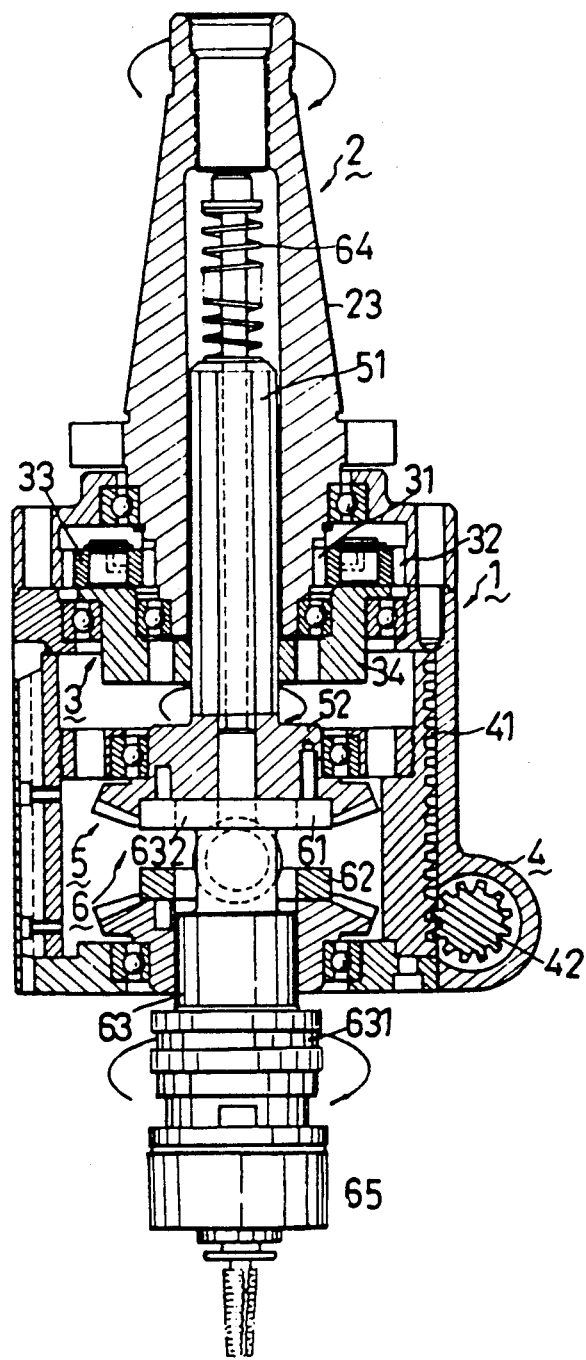
FIG. 7 is a sectional view illustrating the transmission of the internal thread forming apparatus according to this invention.
Figure 8:
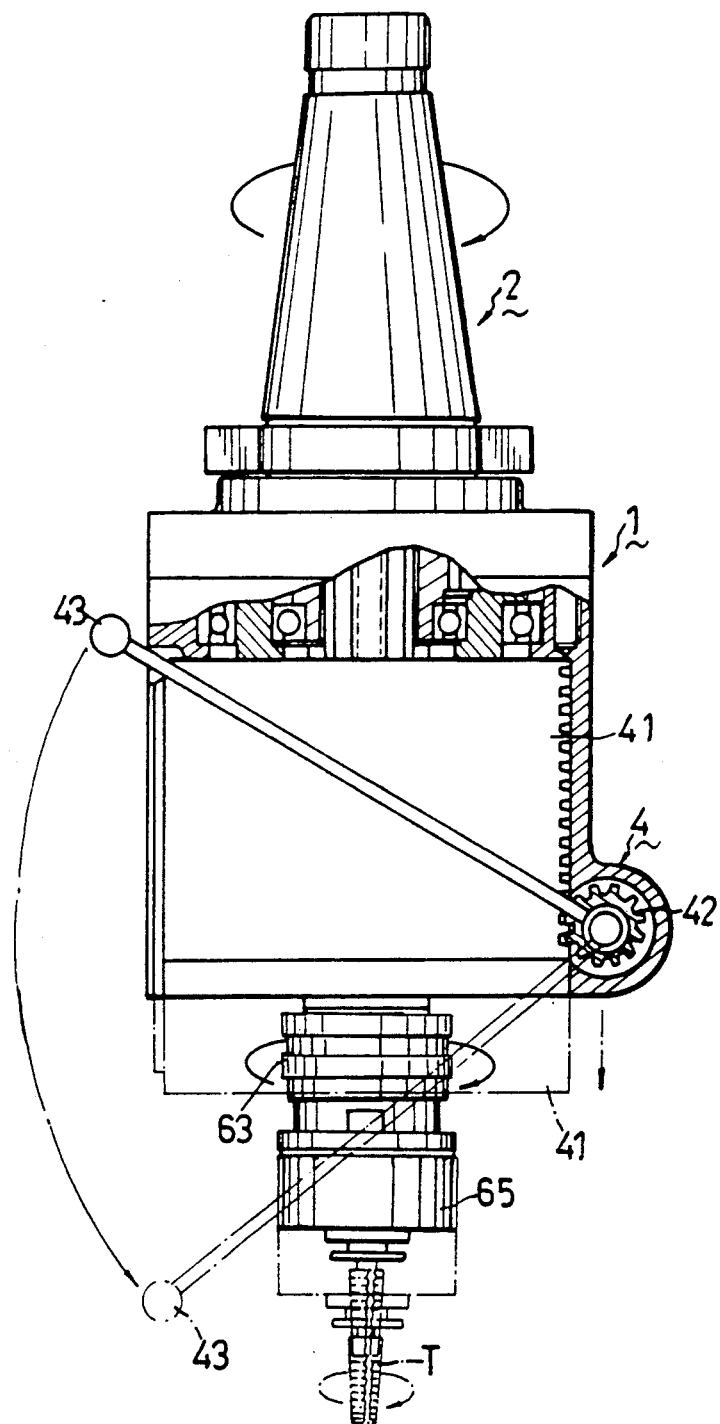
FIG. 8 is a schematic view illustrating the operation of the feeding device of the internal thread forming apparatus according to this invention.
Figure 9:
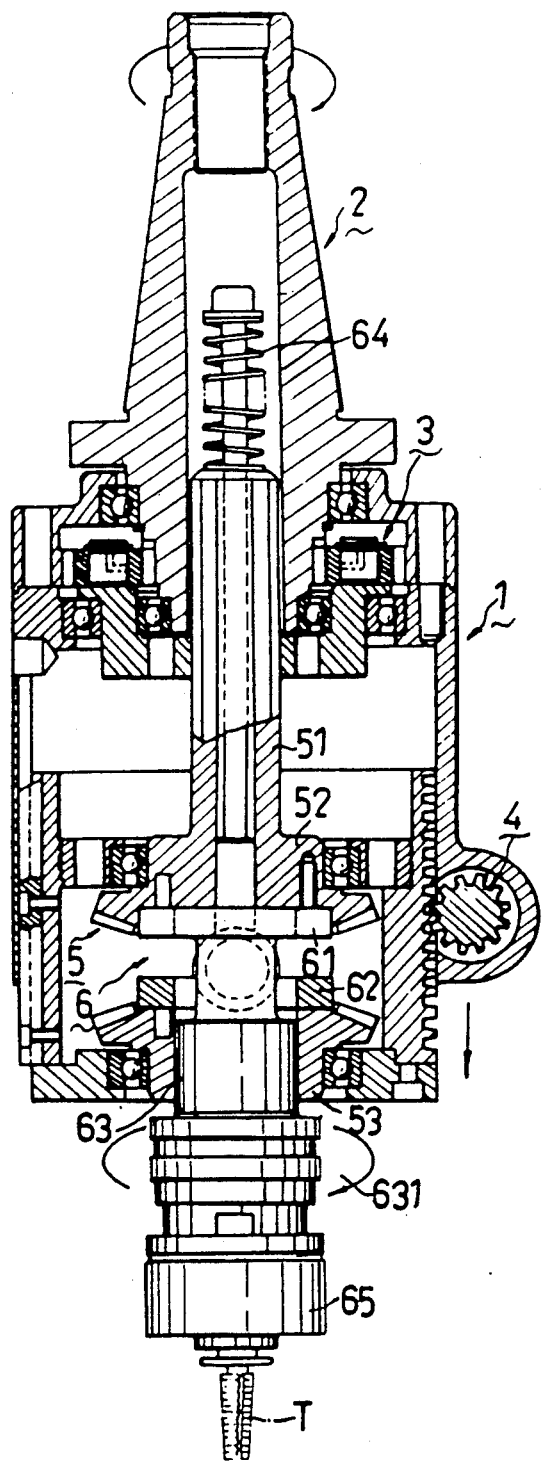
FIG. 9 is a sectional view illustrating the feeding condition of the internal thread forming apparatus according to this invention.
Figure 11:
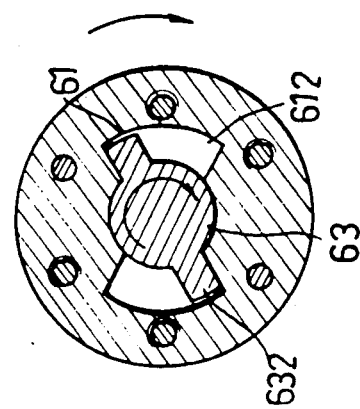
FIG. 11 is a sectional view taken along Line XI—XI in FIG. 10.
Figure 10:
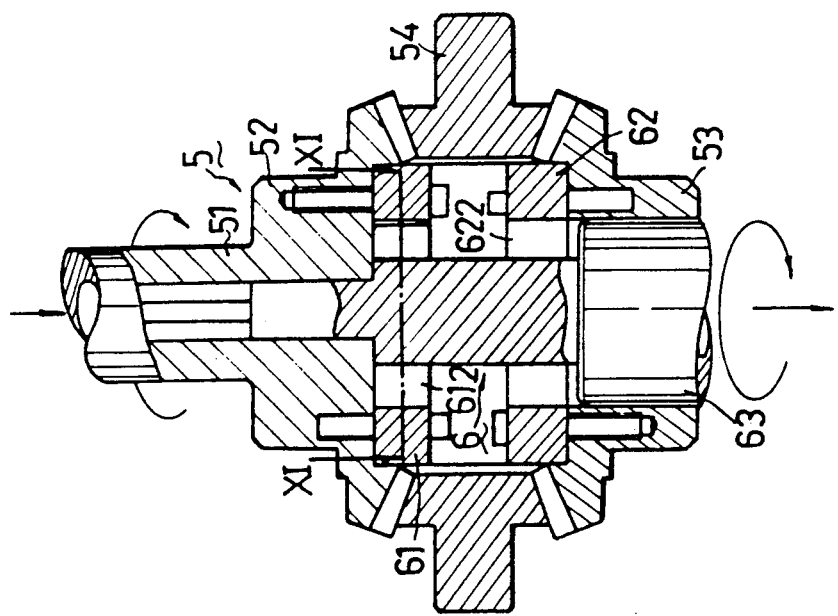

Referring to FIG. 7, in use, the tapered top portion 21 of the driving spindle 2 is connected securely to the rotatable main shaft of a machine tool, such as a milling machine. The housing body 1 is fixed on the machine tool. The connector 65 is fastened to the retainer 631. The tap (T) is then locked on the connector 64. When the internal thread forming apparatus is idle, the movable body 41 is biased by the first return spring 44 to its uppermost position. At this time, the second return spring 64 pushes the positive-revolution driving body 61 downward to engage the driving block 632 within the driving side holes 612 of the positive-revolution driving body 61. The transmission line of the internal thread forming apparatus is the driving spindle 2, the sun gear 31, the carrier 34 (see FIG. 5), the input spline shaft 51, the positive-revolution and reverse-revolution face gears 52, 53, the positive-revolution and reverse-revolution driving bodies 61, 62, the output spindle 63, the connector 65, and the tap (T).

Referring to FIGS. 8, 9, 10, and 11, in operation, when the knob of the rotary lever 43 (see FIG. 8) is depressed to turn the rotary lever 43 downward, the pinion 42 rotates to move the movable body 41 downward. At the same time, the positive and reverse revolution gearing 5 and the automatic clutch 6 are carried on the movable body 41 to move downward. The positive-revolution face gear 52 of the positive and reverse revolution gearing 5 impels the output spindle 63 with the assistance of the second return spring 64, so as to keep the engagement of the driving blocks 632 of the output spindle 63 within the driving side holes 612 of the positive-revolution driving body 61. Accordingly, the tap (T) rotates in one direction so as to form an internal thread in the workpiece.

Figure 12:
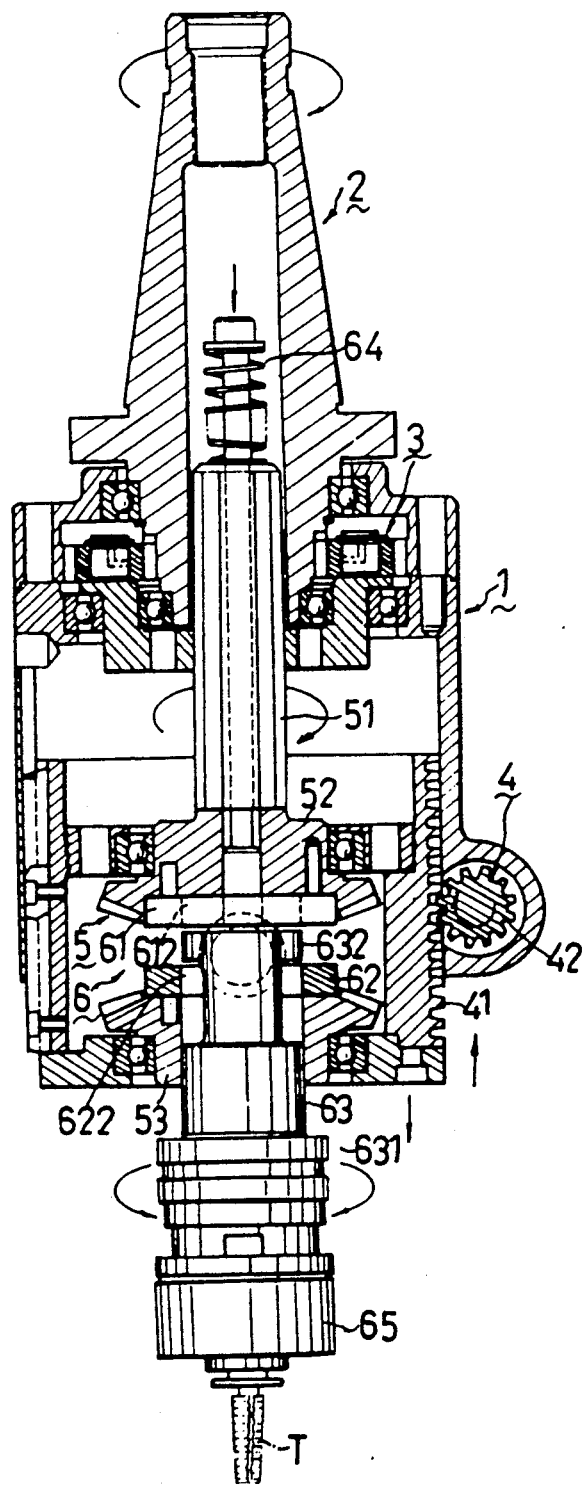
FIGS. 12 and 13 are schematic views illustrating the disconnecting condition of the automatic clutch of the internal thread forming apparatus according to this invention.
Figure 14:
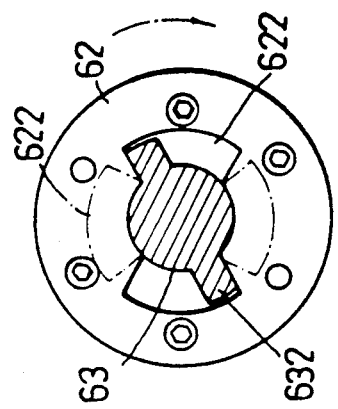
FIG. 14 is a sectional view taken along Line XIV—XIV in FIG. 13.
Figure 13:
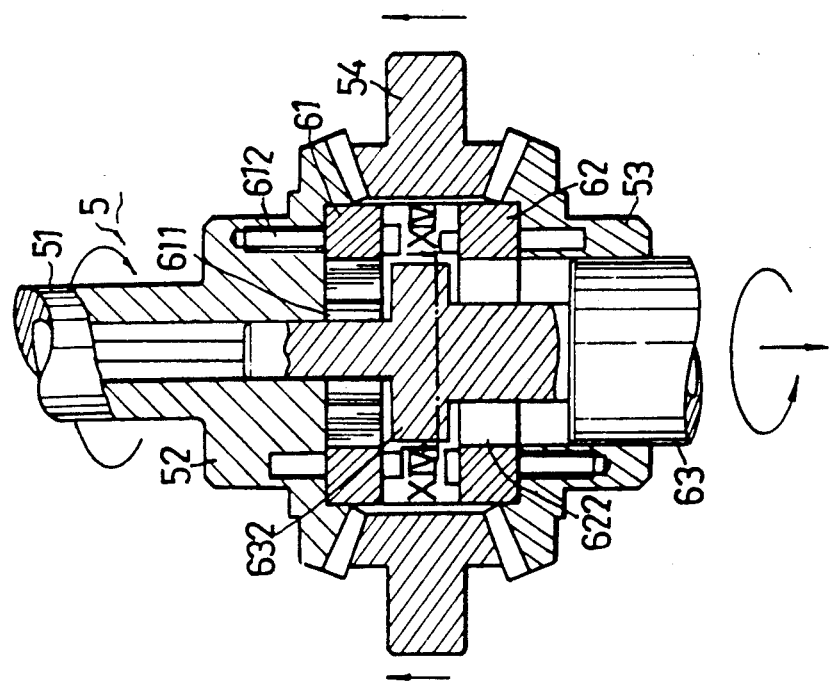

Referring to FIGS. 12, 13 and 14, when the tap is fed a desired depth of cut, the user lets go of the rotary lever 43 (see FIG. 8), so that the first return spring 44 (see FIG. 6) biases the movable body 41 to move upward. The input spline shaft 51 therefore moves upward to compress the second return spring 64. However, because the tap (T) is stuck in the workpiece, the output spindle 63 is fixed in the housing body 1. As a result, the movable body 41, on which both the positive-revolution driving body 61 and the reverse-revolution driving body 62 are carried, moves upward relative to the output spindle 63, so as to disengage the positive-revolution driving body 61 from the driving blocks 632, thereby stopping the rotation of the tap (T). At the same time, the tap (T) cannot move in the workpiece.

Figure 15:
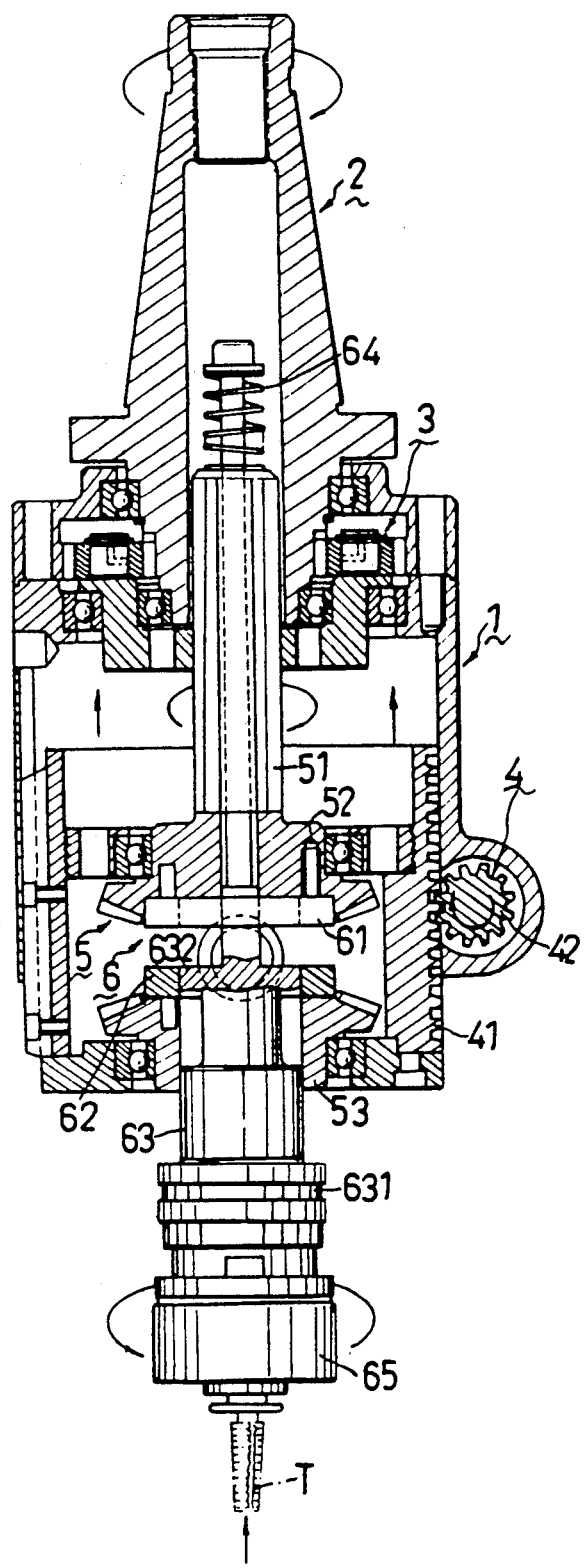
FIG. 15 is a sectional view illustrating the return movement of the tap of the internal thread forming apparatus according to this invention.
Figure 17:
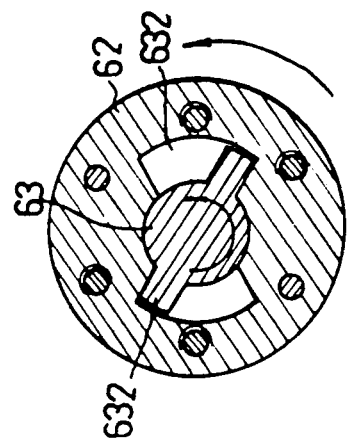
FIG. 17 is a sectional view taken along Line XVII—XVII in FIG. 16.
Figure 16:
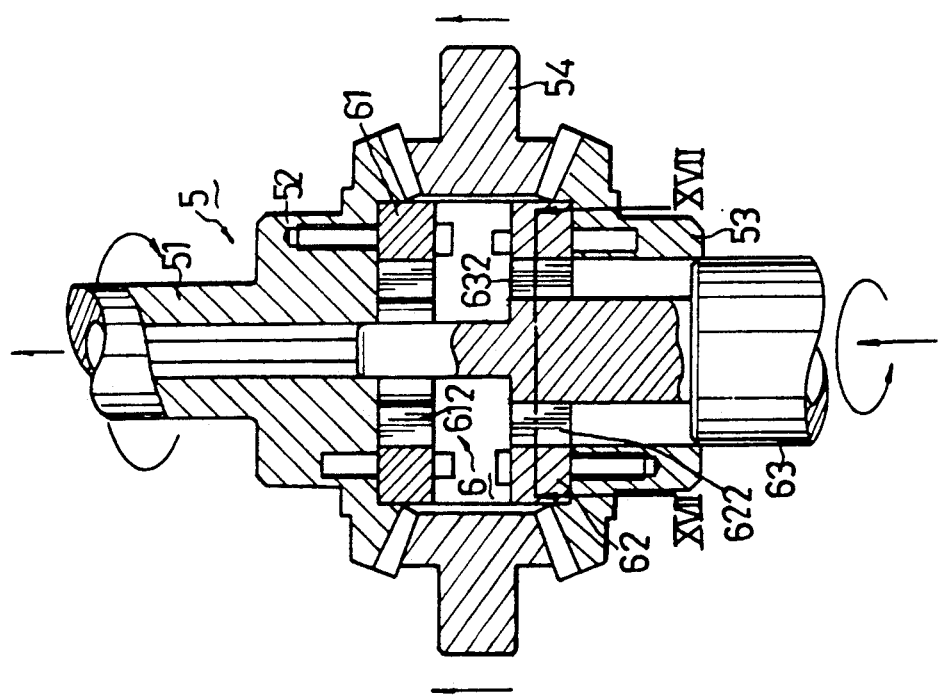
FIG. 16 is a sectional view illustrating the connecting condition of the automatic clutch of the internal thread forming apparatus when returning the tap to its original position in accordance with this invention.
Figure 18:
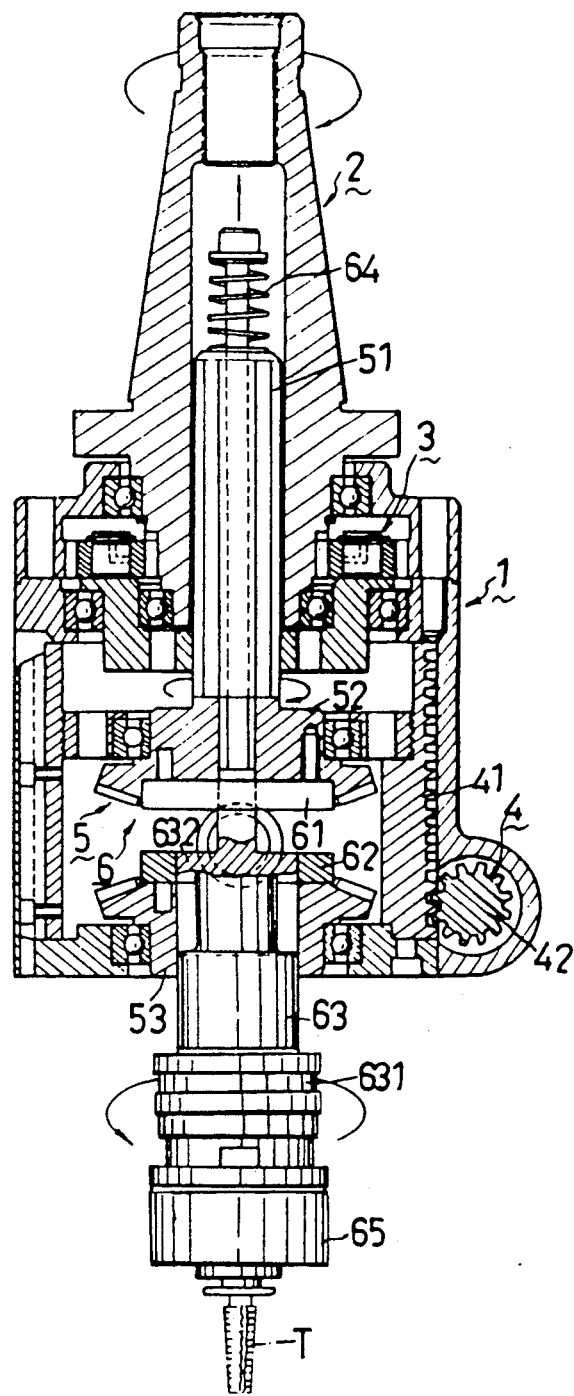
FIG. 18 is a schematic view illustrating the connecting condition of an automatic clutch of the internal thread forming apparatus according to this invention.

Referring to FIGS. 15, 16, and 17, after the rotary lever 43 is released, the reverse-revolution driving body 62 moves upward until the driving blocks 632 of the output spindle 63 engage the reverse-revolution face gear 53. Then, the reverse-revolution face gear 53 impels the driving blocks 632 to move upward, as shown in FIG. 18, in such a manner that the driving blocks 632 engage within the driving side holes 622 of the reverse-revolution driving body 62, due to the fact that the spring force of the first return spring 44 is greater than that of the second return spring 64.

When the movable body 41 reaches its uppermost position, the first return spring 44 no longer applies any force to the output spindle 63, enabling the second return spring 64 to push the positive-revolution face gear 52 to move downward until the driving blocks 632 engage within the driving side holes 612 of the positive-revolution driving body 61 for the next feeding process.

With this invention thus explained, it is apparent that numerous modifications and variations can be made without departing from the scope and spirit of this invention. It is therefore intended that this invention be limited only as indicated in the appended claims.

I claim:

1. An internal thread forming apparatus comprising:
   a housing body adapted to be fixed on a machine tool;
   a driving spindle journalled in a top portion of said housing body and adapted to be connected securely to a rotatable main shaft of said machine tool, so as to rotate with said rotatable main shaft;
   a speed reduction gearing, installed in said housing body, connected to said driving spindle, including a rotating output member rotatable at a speed less than that of said driving spindle;
   a feeding device including a movable body movable vertically within a lower portion of said housing body, a rotary lever installed on said housing body and actuatable to move said movable body downward, and a first return spring biasing said rotary lever to return to a static position;
   a positive and reverse revolution gearing mounted in said movable body and including a positive-revolution face gear, a reverse-revolution face gear, and at least one idle face gear meshing with said positive-revolution face gear and said reverse-revolution face gear, so as to rotate said positive-revolution and reverse-revolution face gears in opposite directions, said positive and reverse revolution gearing being movable synchronously with said movable body in said housing body, said positive-revolution and reverse-revolution face gears being rotatable by said rotating output member of said speed reduction gearing; and
   an automatic clutch including a positive-revolution driving body mounted rotatably in said housing body and connected securely to said positive-revolution face gear so as to rotate said positive-revolution driving body synchronously with said positive-revolution face gear, a reverse-revolution driving body mounted rotatably in said housing body and connected securely to said reverse-revolution face gear so as to rotate said reverse-revolution driving body synchronously with said reverse-revolution face gear, an output spindle mounted slidably within said movable body, a driving block secured to said output spindle and carried on said output spindle to move between an uppermost position, where said driving block engages said positive-revolution driving body, and a lowermost position, where said driving block engages said reverse-revolution driving body, and a second return spring installed in said housing body so as to bias said positive-revolution driving body to engage with said driving block, said output spindle being adapted to mount a tap on a lower end thereof, said positive and reverse revolution gearing impelling said output spindle to move downward while keeping said driving block to engage with said positive-revolution driving body when said rotary lever is actuated, engagement of said driving block with said positive-revolution driving body rotating said tap in one direction, while engagement of said driving block with said reverse-revolution driving body rotates said tap in the opposite direction;

whereby, when said rotary lever is released after feeding said tap with a predetermined depth of cut, said first return spring biases said movable body to move upward relative to said output spindle, due to the fact that said tap is stuck in a workpiece to be machined, so as to engage said reverse-revolution driving body with said driving block, thereby removing said tap from said workpiece with assistance of said first return spring.

2. An internal thread forming apparatus as claimed in claim 1, wherein said speed reduction gearing consists of a planetary gear train which comprises a sun gear sleeved rigidly on said driving spindle, and a ring gear disposed on an inner wall of said housing body.

3. An internal thread forming apparatus as claimed in claim 1, wherein said movable body includes a rack secured to a side wall thereof, said feeding device including a pinion mounted rotatably on said housing body, said pinion meshing with said rack and being connected to said rotary lever, whereby, when said rotary lever is actuated, said pinion rotates to move said movable body downward in said housing body.

* * * * *